Patented Aug. 20, 1935

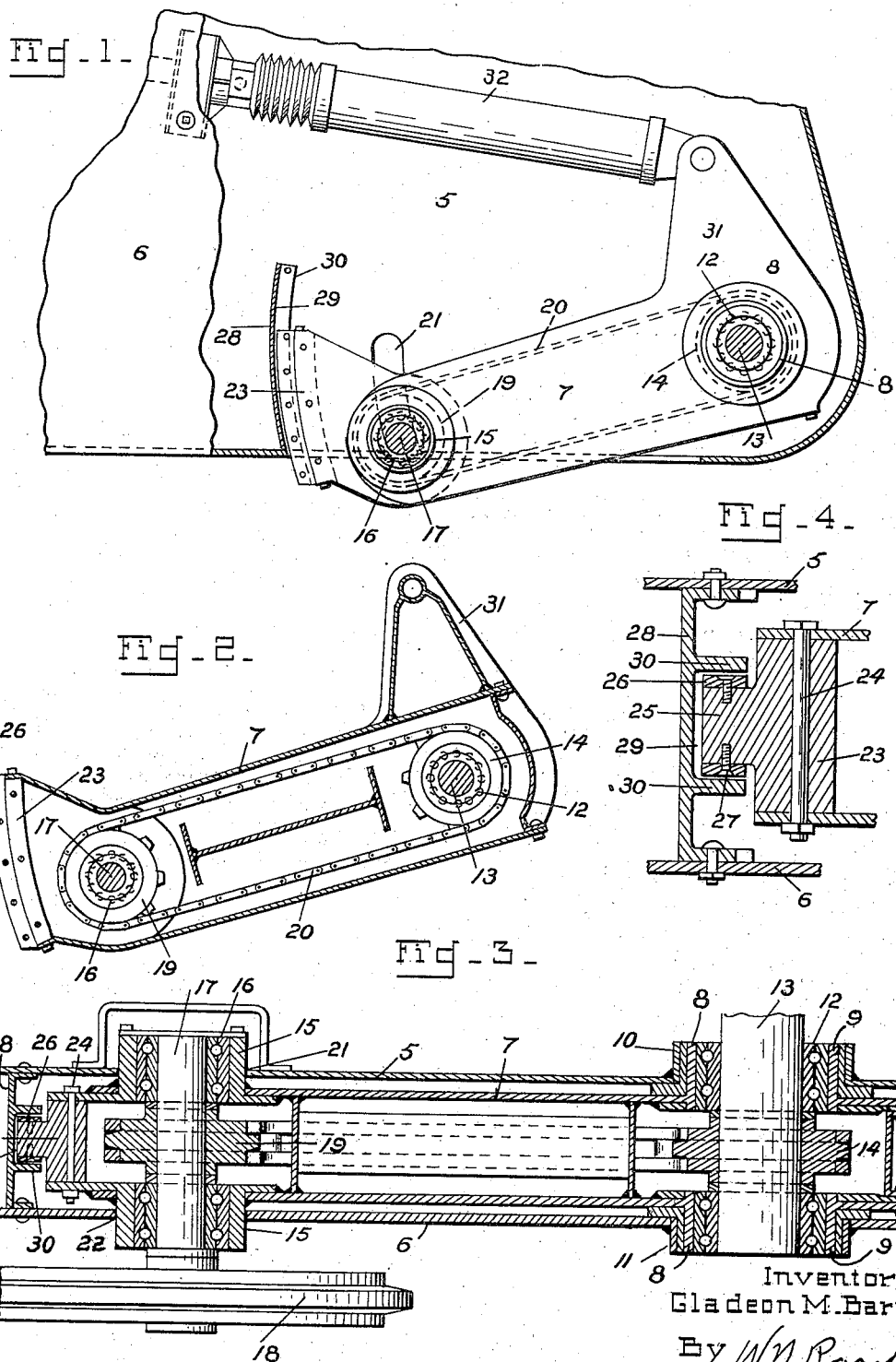

2,011,564

UNITED STATES PATENT OFFICE 2,011,564

WHEEL MOUNTING

Gladeon M. Barnes, United States Army,
Hastings, Mich.

Application February 28, 1934, Serial No. 713,356

4 Claims. (Cl. 180—9.1)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to a wheel mounting.

In heavy vehicles of the track-laying type it has been customary to place each of the wheels on the end of an arm which is pivotally mounted on the body of the vehicle and acts against a suspension spring. Lateral forces acting on the wheel as in turning at high speed or in going over obstacles subject the arm to both bending and torsion. Even when the wheel arm is heavy and of great strength it has twisted as much as fourteen degrees.

The purpose of the present invention is to provide a wheel mounting in which a relatively light arm is held against twisting and in which the shaft forming the pivot of the arm is held against bending.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a view in side elevation of the improved wheel mounting, the outer hull being broken away.

Fig. 2 is a vertical longitudinal sectional view of the arm.

Fig. 3 is a horizontal longitudinal sectional view of the arm.

Fig. 4 is an enlarged sectional view through the guide of the arm.

Referring to the drawing by characters of reference there is shown a portion of the body of a vehicle having an inner hull 5 and an outer hull 6 spaced therefrom.

An arm 7, preferably hollow and conveniently formed of welded plates, is disposed between the hulls 5 and 6. It is provided adjacent one of its ends with a pair of hollow trunnions 8—8 mounted in bushings 9—9 fitted in bearing sleeves 10 and 11 secured respectively to the inner and outer hulls. The trunnions are additionally supported through anti-friction bearings 12—12 on a shaft 13 carried by the body of the vehicle. Where this shaft is a driving member, as in the illustration, it carries a sprocket wheel 14 between the bearings 12—12.

The outer end of the arm 7 is provided with bearing sleeves 15—15 in which are fitted anti-friction bearing units 16—16 that support a spindle 17 carrying a wheel 18. The wheel 18 is adapted to run on a self-laying track or on a road. Where the wheel is also to serve as a driving wheel its spindle is provided with a sprocket wheel 19 spacing the bearing units 16. A drive chain 20 connects the sprocket wheels 14 and 19.

The inner hull 5 is provided with a channel 21 and the outer hull 6 is provided with a complementary slot 22 to accommodate the bearing sleeves 15 during movement of the arm 7.

The free end of the hollow arm is closed by a plate 23 secured by bolts 24. A narrow guide 25 on the outer side of the plate is formed on an arc with the axis of trunnions 8 as a center and includes bronze strips 26 secured to its sides as by the screws 27.

An arcuate plate 28 disposed between the hulls and rigidly secured thereto has a channel 29 with spaced sides 30—30 constituting a guideway for receiving the guide 25. The guide and guideway have sufficient strength to carry the twisting load and to support the arm 7 in cases where the wheel is subjected to a lateral force as in turning at high speed or in encountering an obstruction. There is a slight clearance between the guide and guideway so that the arm 7 will carry some of the load before it comes into contact with the guideway.

By virtue of this arrangement the arm 7 may be of light weight as it is only subjected to bending without torsion. It is protected against lateral blows by means of the hulls 5 and 6.

The trunnioning of the arm 7 in the outer and inner hulls gives additional support both to the arm 7 and the shaft 13. Where the wheel is to be driven by chain and sprockets carried by the arm, the maintenance of the shaft 13 and spindle 17 in parallel relation will insure alignment of the chain and sprockets.

The pivoted end of the arm 7 includes a short arm 31 which is attached to a resilient suspension unit 32 which forms the subject of a separate application Serial No. 713,357 filed February 28, 1934.

I claim:

1. In a vehicle, a body including an inner hull and an outer hull spaced therefrom, aligned bearing sleeves in the hulls, an arm disposed between the hulls, hollow trunnions on the arm adjacent one end and mounted in the bearing sleeves of the hulls, a shaft carried by the body and extending through the hollow trunnions, anti-friction bearing units between the shaft and trunnions, a sprocket wheel carried by the shaft between the anti-friction bearing units, aligned bearing sleeves on the arm adjacent its free end, a spindle extending through said sleeves, anti-friction bearing units between the spindle and sleeves, a sprocket wheel carried by the spindle between the anti-friction bearing units, a chain trained about the sprocket wheels, a wheel on the outer end of the spindle, a guide on the free end of the arm, and a guideway carried by the hulls and receiving the guide on the arm.

2. In a vehicle, a body including an inner hull and an outer hull spaced therefrom, aligned bearing sleeves in the hulls, an arm disposed between the hulls, hollow trunnions on the arm adjacent one end and mounted in the bearing sleeves of the hulls, a shaft carried by the body and extending through the hollow trunnions, anti-friction bearing units between the shaft and trunnions, aligned bearing sleeves on the arm adjacent its free end, a spindle extending through said sleeves, anti-friction bearing units between the spindle and sleeves, a wheel on the outer end of the spindle, a guide on the free end of the arm, and a guideway carried by the hulls and receiving the guide on the arm.

3. In a vehicle, a body including spaced supporting members, aligned bearing sleeves in the supporting members, an arm disposed between the supporting members, hollow trunnions on the arm adjacent one end and mounted in the bearing sleeves of said members, a shaft carried by the body and extending through the hollow trunnions, a sprocket wheel on said shaft, a spindle carried by the free end of the arm, a sprocket wheel on the spindle, a chain trained about the sprocket wheels, a wheel on the spindle, a guide on the free end of the arm and a guideway carried by the supporting members and receiving the guide on the arm.

4. In a vehicle, a body including spaced supporting members, aligned bearing sleeves in the supporting members, an arm disposed between the supporting members, hollow trunnions on the arm adjacent one end and mounted in the bearing sleeves of said members, a shaft carried by the body and extending through the hollow trunnions, a spindle carried by the free end of the arm, a wheel on the spindle, a guide on the free end of the arm and a guideway carried by the supporting members and receiving the guide on the arm.

GLADEON M. BARNES.